United States Patent
Wendling

(10) Patent No.: US 8,281,358 B2
(45) Date of Patent: Oct. 2, 2012

(54) METHOD FOR TRANSMITTING A STREAM OF DIGITAL DATA AND CONTROL MESSAGES ASSOCIATED TO SAID STREAM TO MOBILE EQUIPMENTS

(75) Inventor: Bertrand Wendling, Viroflay (FR)

(73) Assignee: Nagra France SAS, Paris (FR)

( * ) Notice: Subject to any disclaimer, the term of this patent is extended or adjusted under 35 U.S.C. 154(b) by 237 days.

(21) Appl. No.: 11/988,391

(22) PCT Filed: Jul. 4, 2006

(86) PCT No.: PCT/EP2006/063864
§ 371 (c)(1),
(2), (4) Date: Apr. 2, 2009

(87) PCT Pub. No.: WO2007/003641
PCT Pub. Date: Jan. 11, 2007

(65) Prior Publication Data
US 2009/0328094 A1 Dec. 31, 2009

(30) Foreign Application Priority Data
Jul. 6, 2005 (EP) .................................... 05291468

(51) Int. Cl.
*H04N 7/173* (2011.01)
(52) U.S. Cl. .......... 725/134; 725/139; 725/151; 725/31; 380/228; 380/229; 380/230; 380/232; 380/233; 380/239; 380/210; 455/3.06
(58) Field of Classification Search ........................ None
See application file for complete search history.

(56) References Cited

U.S. PATENT DOCUMENTS

| | | | |
|---|---|---|---|
| 5,349,641 A | 9/1994 | Coutrot et al. | |
| 7,620,185 B2 * | 11/2009 | Lahtinen et al. | 380/277 |
| 2002/0083438 A1 * | 6/2002 | So et al. | 725/31 |
| 2003/0086017 A1 * | 5/2003 | Bogot | 348/558 |
| 2003/0152364 A1 | 8/2003 | Wajs | |

(Continued)

FOREIGN PATENT DOCUMENTS
EP 0 583 202 8/1993
(Continued)

OTHER PUBLICATIONS

"Digital Video Broadcasting (DVB); DVC-H Implementation Guidelines", European Broadcasting Union, ETSI Standards, ETSI TR 102 377, European Telecommunications Standards Institute, Sophia-Antip, France, vol. BC, No. V1.2.1, XP014027140, ISSN: 0000-0001, Nov. 2005.

(Continued)

*Primary Examiner* — Dominic D Saltarelli
*Assistant Examiner* — Jason J Chung
(74) *Attorney, Agent, or Firm* — Harness, Dickey & Pierce, P.L.C.

(57) ABSTRACT

The invention concerns a method for transmitting a flow of digital data and of controlled messages associated with said flow addressed to mobile terminals. The flow comprises successive bursts of data of encrypted contents with control words included in the control messages transmitted in parallel with said flow. The method is characterized in that it consists in inserting a control message in each transmitted burst of contents, said message containing at least one control word designed to decrypt the contents of said burst.

2 Claims, 3 Drawing Sheets

U.S. PATENT DOCUMENTS

| | | | |
|---|---|---|---|
| 2004/0136352 A1* | 7/2004 | Fu et al. | 370/341 |
| 2004/0181811 A1* | 9/2004 | Rakib | 725/122 |
| 2005/0074125 A1* | 4/2005 | Chavanne et al. | 380/278 |
| 2005/0100164 A1* | 5/2005 | Wachtfogel et al. | 380/268 |
| 2005/0100167 A1* | 5/2005 | Alve et al. | 380/277 |
| 2005/0190794 A1* | 9/2005 | Krause et al. | 370/485 |
| 2006/0018470 A1* | 1/2006 | Paila et al. | 380/223 |

FOREIGN PATENT DOCUMENTS

| | | |
|---|---|---|
| EP | 1 447 983 | 8/2004 |
| EP | 1696575 A1 * | 8/2006 |
| WO | WO 03090463 A2 * | 10/2003 |
| WO | WO 2004071091 A1 * | 8/2004 |
| WO | WO 2005/060113 * | 6/2005 |

OTHER PUBLICATIONS

"Digital Video Broadcasting (DVB); DVC-H Implementation Guidelines", European Broadcasting Union, ETSI Standards, ETSI TR 102 377, European Telecommunications Standards Institute, Sophia-Antip, France, vol. BC, No. V1.1.1, XP014027140, ISSN: 0000-0001, Feb. 2005.

* cited by examiner

METHOD FOR TRANSMITTING A STREAM OF DIGITAL DATA AND CONTROL MESSAGES ASSOCIATED TO SAID STREAM TO MOBILE EQUIPMENTS

FIELD OF THE INVENTION

The present invention relates to the domain of terrestrial broadcasting of a digital data stream according to a standard of the DVB-H type (Digital Video Broadcast, Handheld) or the like. The stream is received by mobile equipments, such as for example, a mobile phone, a PDA (Personal Digital Assistant), a portable digital television receiver or a laptop.

The broadcasted data is in general encrypted and cannot be received in plain text other than by authorized equipment whose user has acquired the necessary rights. These rights, stored in a security module associated to the mobile equipment, consist of a set of keys allowing the decryption of control words contained in control messages ECM (Entitlement Control Message) that accompany the broadcasted data.

A security module is a reputedly tamper proof device containing different encryption/decryption keys, information for identifying a user on a network and data defining the rights acquired by the user for reception of a broadcasted content. The security module can take different forms such as a removable smart card inserted into a reader, an integrated circuit welded onto a mother board or an SIM type card (Subscriber Identity Module) that is inserted in most mobile equipment.

TECHNICAL BACKGROUND

DVB-H technology derives from the standard DVB-T (Digital Video Broadcast, Terrestrial) with which it is largely compatible while having particular characteristics depending essentially on the features of the mobile reception equipments.

A known problem with DVB-H mobile equipment is the limited capacity of the batteries. In fact, the compatibility with the DVB-T standard requires demodulation and decoding mechanisms at wide band and high data throughput (up to 10 Mbit/s per channel) leading to a high energy consumption of the concerned electronic circuits. The solution adopted to reduce consumption is the transmission of the stream in bursts rather than continuously. The mobile receiver equipment is thus only enabled periodically to receive the bursts and is in stand-by mode during the interruptions. This mode, specific to DVB-H, thus allows a reduction of the consumption of the mobile equipment by a factor ten or more.

In general, the broadcasted stream comprises several multiplexed services such as for example an audio/video content, files or software applications to be downloaded. In the DVB-T mode, the whole stream is decoded before being able to access a selected service. The energy saved by the DVB-H mode is based on the fact that only the parts of the stream containing the data of a selected service are processed, which requires a suitable reorganization of the stream. The multiplexing of services is then carried out according to a time slicing. The data of a particular service is not transmitted in a continuous way but in compact periodic bursts with interruptions between the bursts.

In the case of conditional access digital pay television, the data stream comprises the encrypted audio/video content, control messages and management messages. The control messages ECM (Entitlement Control Message) contain control words for decrypting the audio/video content. In the DVB-T mode where the stream is transmitted in a continuous way, decryption is carried out by a decoder in direct mode at reception of data or in deferred mode after storage of all or part of the stream. The control messages are decrypted for allowing the extraction of the control words used to decrypt the broadcasted content. In order to synchronize the control messages with the broadcasted or recorded content, different solutions have been developed among which we can mention:

The document US2003152364 proposing the introduction of several control words in a control message ECM. Such a message contains the current control word to decrypt the data block in process, the control words preceding and following this current word for decrypting a recorded stream and this in the rewind or fast forward modes of a digital audio/video recorder.

The document EP1447983 concerns the creation of a correspondence table between recorded parts of the stream and control messages accompanying the recorded parts of the stream.

The document EP0583202 describing the transmission with each program of a control message pertaining to this program with a certain frequency and the control messages pertaining to other programs with a lower frequency. The control message of the selected program is used to decrypt it in direct mode and the other control messages are stored to be able to proceed quickly to the decryption of another program to be selected afterwards.

In DVB-H technology, the stream comprises a plurality of services transmitted by successive bursts containing the encrypted content (digital audio/video programs, files or software applications, etc.) and the control messages necessary for the decryption of the content. At passing from one service to another or during the interruptions of stream reception, it is possible to receive the bursts of content without receiving the corresponding control messages. This problem is due to the fact that the bursts of control messages are not synchronized with those of the content. Each burst is transmitted in the form of independent IP packages (Internet Protocol). When the receiver is locked on a given channel, this interval is not important as the control words contained in the control messages relate to blocks transmitted subsequently with respect to the current blocks. For example, in the case of successive service or channel changes (zapping), the bursts of content can be received without being decrypted by a control word because of the non-reception of the corresponding control messages due to the lack of synchronization of the "content" and "control messages" services.

The solutions of the prior art according to the aforementioned examples do not apply in the case in which the stream is made up of bursts corresponding to independent services. As the mobile equipment is only activated for selected services, it cannot receive data from other services as in the case of a continuous stream and of a receiver activated to receive all the services of the stream. In fact, in DVB-T mode, the stream is decoded in its entirety for accessing a service, thus the control messages can be received constantly even if the user switches from one service to another.

In the document of the ETSI TR 102 377 "DVB-H Implementation Guidelines" standards, the receiving mobile equipment must receive the control messages ECM before the bursts. The proposed solution consists of activating the receiver before reception of a burst in order to wait the arrival of ECM messages. These messages are transmitted in continuous mode independently of the bursts stream and the minimum time interval between the messages has to be lower as the duration of a burst.

SUMMARY OF THE INVENTION

The aim of the present invention is to remedy the lack of synchronization between the bursts of different services transmitted in a stream intended for DVB-H mobile equipment.

Another aim is to ensure an optimal reception of the content by allowing a decryption of all the bursts despite frequent changes from one service to another or the loss or the corruption of the reception of control messages.

These aims are achieved through a method for transmitting a digital data stream and control messages associated to said stream intended for mobile equipments, said stream comprising successive data bursts of a content encrypted with control words included in the control messages transmitted in parallel with the stream, said method is characterized in that it comprises the following steps:

- receiving and storing a control message in a memory,
- inserting the control message, previously stored, in at least one burst of content to be transmitted until reception of a new control message,
- repeating the preceding operations of storage and insertion during each reception of a new control message, said message containing at least one control word intended for decrypting the content of said burst.

The solution consists of associating in any way the content bursts with the control messages serving to decrypt the content of these bursts. In general, the control message is placed at the start of the useful part of the burst, namely after the burst's identification data. Thus, during a change of service the control messages always remain available without having to wait for their reception from other bursts. The data of the content can be decrypted at reception of the first burst without interruption or scrambling caused by the reception of encrypted bursts without possibility for decrypting them.

In order to ensure the continuity of decryption in the case of untimely cuts of the transmission, the control message associated to a burst can contain supplementary control words allowing the decryption of the further bursts received after the cut. In fact, the mobile equipment can include a memory for temporarily storing control words valid for decrypting a certain number of bursts to be received subsequently for a given service.

BRIEF DESCRIPTION OF THE DRAWINGS

The invention will be better understood thanks to the following detailed description that refers to the annexed Figures given as non-limitative examples.

DETAILED DESCRIPTION OF THE INVENTION

In DVB-H mode, the different multiplexed services (S1, S2, S3, S4) of a digital data stream are broadcasted by periodic bursts ($s_i$). For above mentioned energy saving reasons, the mobile equipment is only activated at the time of the reception of one or several services. For example, in FIG. 1, the equipment is only active during the duration (L1) of a service (S1) which is received during time periods (P1), whereas it will be on stand-by mode during the intervals separating the bursts ($s_i$) of the service (S1).

Figure 1:
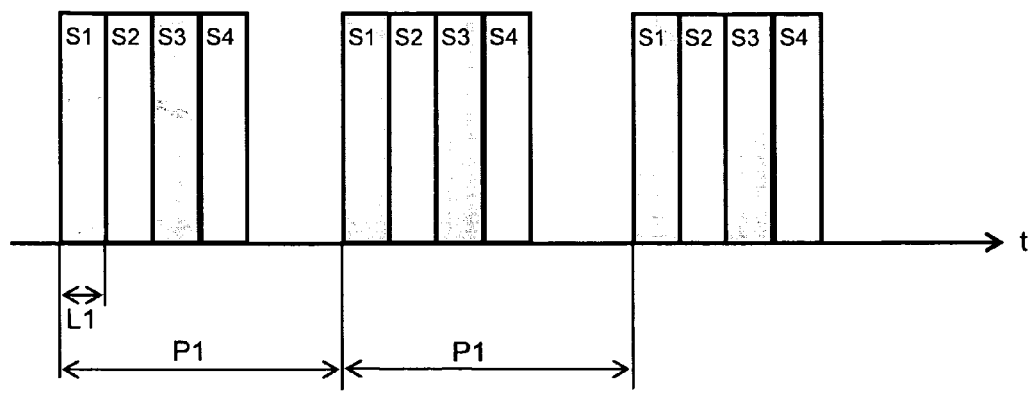
FIG. 1 shows a diagram of a DVB-H stream where the services are transmitted in bursts.
Figure 2:
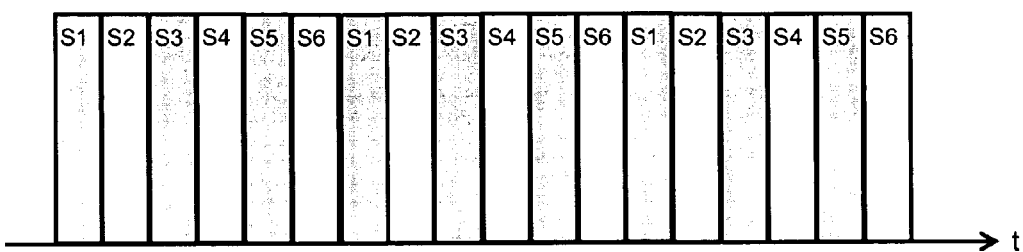
FIG. 2 shows a diagram of a stream where the bursts of the different services form a continuous stream.

The services multiplexing can form again a continuous and uninterrupted stream transmitted with a constant throughput when additional service bursts ($s_i$) are transmitted during the interruption periods. FIG. 2 shows an example where the intervals between S4 and S1 of FIG. 1 are filled with supplementary services S5 and S6. This type of stream is received in an intermittent way by the mobile equipment that synchronizes to the bursts ($s_i$) of one or several selected services and switches to stand-by mode when other services are transmitted. The ratio between the interruption period of the bursts ($s_i$) and the activity period of the mobile equipment during reception of selected services gives a measure of the energy saving of the DVB-H mode.

The duration (L) of a burst is approximately some hundred of milliseconds while the intermediary interruption period (P) can last for a few seconds. The ratio between these durations can thus reach more than 90% depending on the configuration of the bursts ($s_i$) of the broadcasted signal and on the number of selected services.

Figure 3:
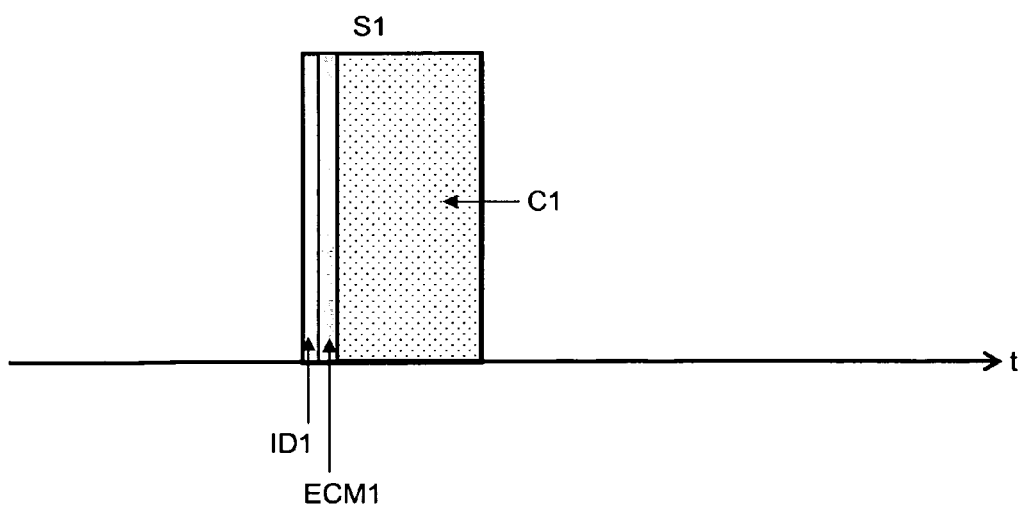
FIG. 3 shows a burst comprising an inserted control message according to the invention.
Figure 4:
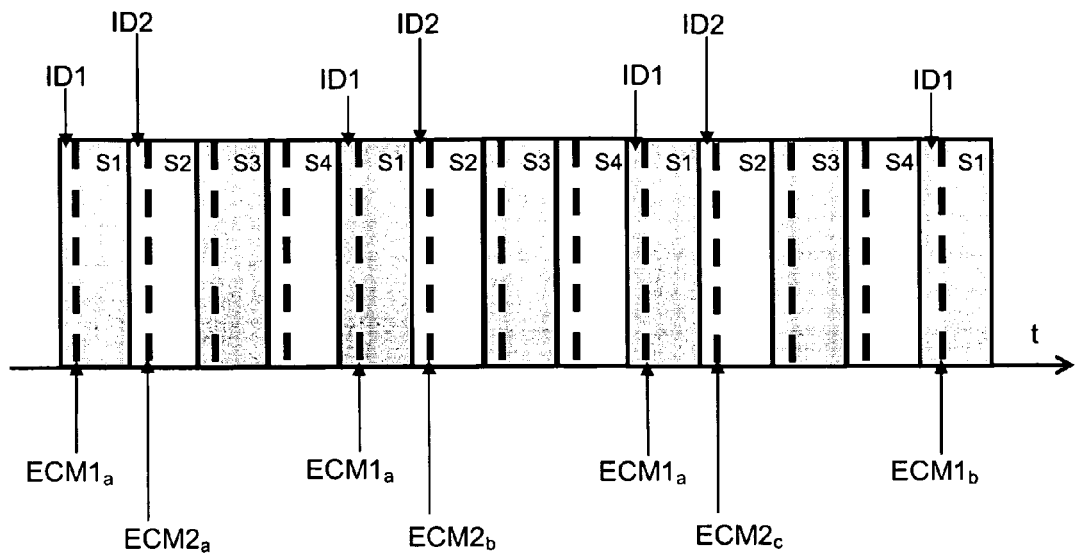
FIG. 4 shows a diagram of a stream where the bursts each comprise a control message.

The method of the invention illustrated in FIG. 4 showing that a control message ECM is inserted into each burst of a service. According to one preferred embodiment, the control message is placed at the start of the burst following the identifier ID and before the encrypted or useful content (C1) of the burst. FIG. 3 shows an enlarged view of a burst of the service S1 containing a control message ECM1 after the identifier ID1 of the burst. This identifier ID1 is used by the mobile equipment to synchronize on the selected service and to determine the activation and stand-by periods. The control message ECM1 contains at least one control word allowing the decryption of the data of the content (C1) of the service S1 to which it is associated.

In a stream of bursts ($s_i$) of several multiplexed services such as schematized in FIG. 4, the control messages, respectively the control words that are included in there can change from one burst of the same service to another or of a group of bursts to another. For example, for the service S1, the control message ECM1$a$ remains constant during three bursts in order to change for the further burst (ECM1B). It is also possible to change the control word for each burst as is the case for the service S2 of the example where the control messages (ECM2$a$, ECM2$b$, ECM2$c$ . . . ) inserted at the start of the bursts ($s_i$) are never identical.

Figure 6:
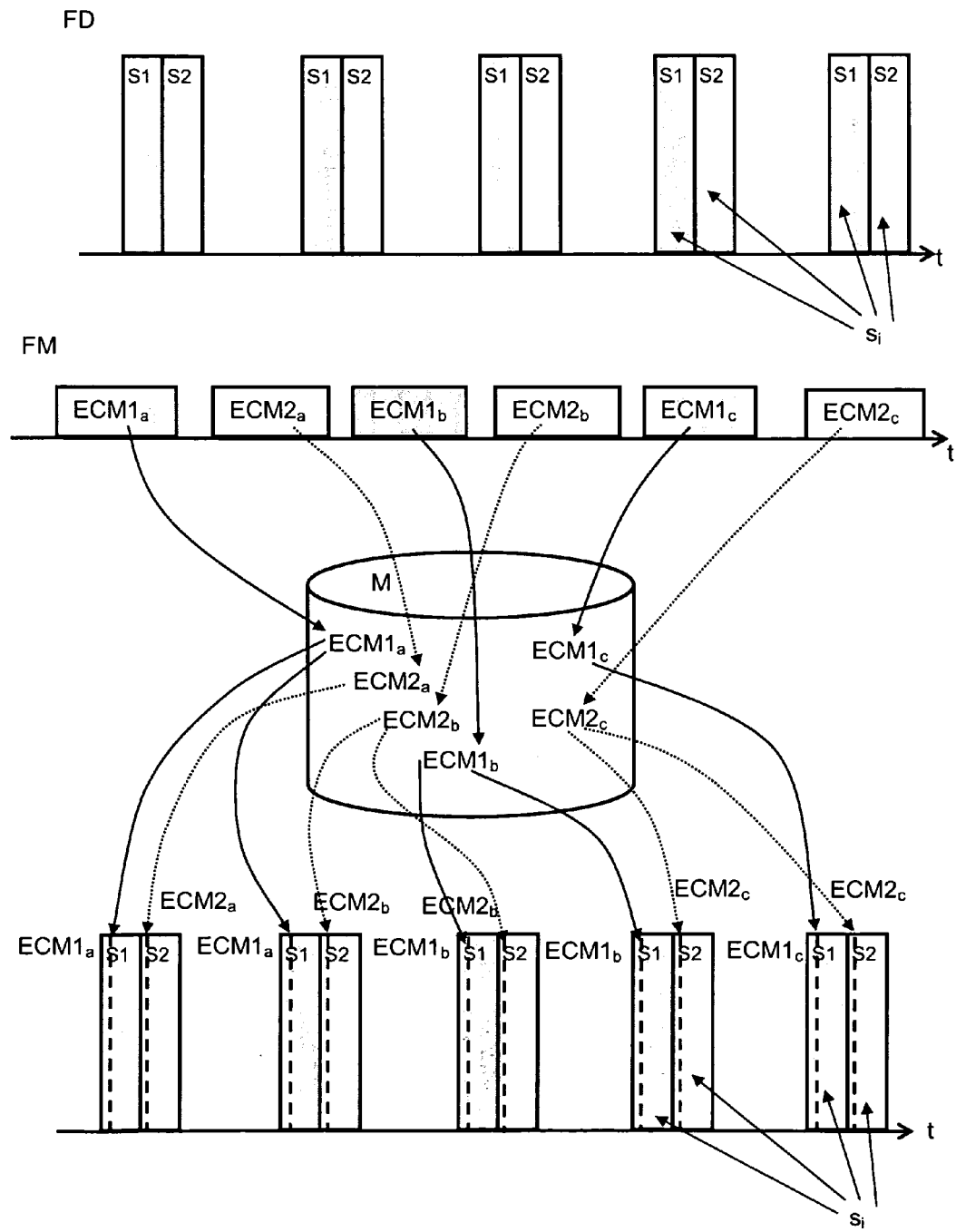
FIG. 6 illustrates a schematic of the method steps according to the invention wherein ECM messages are stored in a memory than inserted into the bursts of the corresponding services.

The schematic of FIG. 6 shows a data stream (FD) comprising bursts ($s_i$) of two services (S1, S2) and a stream (FM) of ECM control messages associated to the services (S1, S2) of the stream (FD). The control messages (ECM1$_a$, ECM1$_b$, ECM1$_c$, . . . ) and (ECM2$_a$, ECM2$_b$, ECM2$_c$, . . . ) used to decrypt respectively the encrypted data of the services (S1) and (S2) are stored in a memory (M), than extracted in order to be inserted into the corresponding bursts ($s_i$) of each service (S1, S2). A same message ECM is inserted in several consecutive bursts ($s_i$) of a service until the reception of a new message ECM concerning this service. In the example of FIG. 6, the messages ECM1$_a$ et ECM1$_b$ are repeated in two consecutive bursts of the service (S1) and the message ECM1$c$ is introduced into the further burst(s) until reception of the following message and so on. In a similar way, the control messages (ECM2$_a$, ECM2$_b$, ECM2$_c$, . . . ) of the service (S2) are introduced into the respective bursts. According to a preferred configuration, the messages are placed at the head of the bursts ($s_i$) in order to reduce the time for accessing the content of the bursts ($s_i$) during zapping (fast passing from service (S1) to service (S2) and reversely). It has to be noted that the ECM messages stored in the memory (M) are erased as new messages associated to a given service arrive. In other words, an ECM message is kept as long as it is used to be introduced into the bursts ($s_i$) and this until reception of a new message, for example the message ECM1$a$ is replaced by the message ECM1$b$.

The document of the standards ETSI TR 102 377 "DVB-H Implementation Guidelines", does not foresee this method of transmission of ECM messages in the bursts ($s_i$) of the services (S1, S2, . . . ). They are transmitted in an independent stream (FM) in parallel to the stream of the content bursts ($s_i$). According to this document, the transmission of the bursts and of the messages is then simplified because it requires neither memory nor device for memory reading and for introducing messages into the appropriate bursts. Furthermore, the configuration of the mobile reception equipment is also different for allowing a permanent reception of the messages stream while being synchronized with the bursts of the services which content has to be decrypted.

The insertion of the control message at the beginning of the burst allows a control word to be obtained immediately when the mobile equipment switches from one service to another. In fact, after having read the identifier (ID1, ID2), it extracts the necessary control word from the control message ECM for decrypting the data from the content that follows in the burst. The extracted control word can be stored in a temporary memory of the mobile equipment in order to be used for the next bursts ($s_i$) when a certain number of the latter contain the same control message as in the case of the service S1 in the example.

In an audio/video embodiment for example, where the different services each represent a television channel and thanks to the control message preceding the encrypted data, it becomes easy to pass from one channel to another and vice-versa without a blackout of the image or the sound. The control word for decrypting the audio/video data is thus immediately available to the decryption unit of the mobile equipment.

Figure 5:
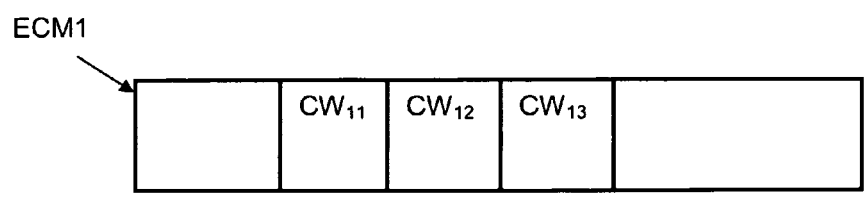
FIG. 5 shows a control message comprising several control words.

A control message ECM can contain several control words as schematized in FIG. 5. In order to increase the processing speed of the bursts ($s_i$), the mobile equipment stores several control words (CW11, CW12, CW13) related to a given service S1 and corresponding to a series of bursts of this service. According to the hardware and software configuration (decryption algorithm) of the mobile equipment, it is faster to extract a certain number of control words from one or several messages and store them than to extract them each time from the message transmitted with the bursts ($s_i$). The mobile equipment extracts the control words from a certain number of bursts ($s_i$) for storing them, when these stored words become obsolete; it extracts and stores new words from further bursts ($s_i$) and so on.

The control message can also contain, in addition to the current control word for decrypting the burst of current data, the control words of previous and following bursts ($s_i$). This alternative is useful when the mobile equipment is provided with a mass storage unit suitable for recording all or part of the broadcasted data. In fact, the implementation of these particular control words allows a fast forward or back browsing of recorded encrypted data.

The invention calimed is:

1. A method for transmitting a digital data stream and control messages associated with the digital data stream to a plurality of mobile equipment, the digital data stream including successive data bursts of a service content encrypted with control words, the control words being included in the control messages transmitted in parallel with the digital data stream, the method comprising:

receiving and storing at least one control message in a memory;

retrieving the stored at least one control message from the memory and inserting the at least one control message at a start of a corresponding burst of the service content between an identifier of the corresponding burst and content data of the corresponding burst, the at least one control message including the at least one service content, wherein the identifier synchronizes on the service content and determines an activation and a stand-by period, wherein a same control message is inserted into the bursts of a group of bursts belonging to a same service, the same control message containing a control word for decrypting the content data of each burst of the group, and wherein a plurality of control words are included in a control message, the control words being configured to decrypt the content data of a current burst and a content data of a previous and succeeding bursts of service;

performing the storing and the inserting the at least one control message in the corresponding burst of the service content until a reception of a new control message; and repeating the above receiving, retrieving, storing and inserting using the received new control message.

2. The method of claim 1, wherein a control message specific to each burst of a service is inserted into the respective burst.

* * * * *